United States Patent
Bond et al.

(10) Patent No.: US 9,713,826 B2
(45) Date of Patent: Jul. 25, 2017

(54) POPCORN DISPENSER

(71) Applicant: Nostalgia Products Group, LLC, Green Bay, WI (US)

(72) Inventors: Gregg Bond, Beverly Hills, CA (US); Edward E. Boughton, III, Ventura, CA (US); Rob Houston, Appleton, WI (US)

(73) Assignee: NOSTALGIA PRODUCTS GROUP, LLC, Green Bay, WI (US)

( * ) Notice: Subject to any disclaimer, the term of this patent is extended or adjusted under 35 U.S.C. 154(b) by 854 days.

(21) Appl. No.: 13/962,927

(22) Filed: Aug. 8, 2013

(65) Prior Publication Data

US 2015/0040773 A1 Feb. 12, 2015

(51) Int. Cl.
*A23L 1/18* (2006.01)
*B07B 13/02* (2006.01)
*G07F 17/00* (2006.01)
*A23L 7/187* (2016.01)

(52) U.S. Cl.
CPC .............. *B07B 13/02* (2013.01); *A23L 7/187* (2016.08); *G07F 17/0078* (2013.01)

(58) Field of Classification Search
CPC ....... A23L 1/1815; A23L 7/187; B07B 13/02; G07F 17/0078
USPC ...................... 99/323.11, 323.9, 323.4, 323.5
See application file for complete search history.

(56) References Cited

U.S. PATENT DOCUMENTS

| | | | | |
|---|---|---|---|---|
| 1,182,075 A | * | 5/1916 | Bullis | A23L 7/187 366/146 |
| 2,713,302 A | * | 7/1955 | Crank | A23L 1/1812 99/323.11 |
| 3,641,916 A | * | 2/1972 | McDevitt | A23L 1/1815 99/323.7 |
| 4,727,798 A | * | 3/1988 | Nakamura | A23L 1/1815 99/323.5 |
| 5,035,173 A | * | 7/1991 | Stein | A23L 1/1812 99/323.7 |
| 2004/0194633 A1 | * | 10/2004 | Bourne | A23L 1/1815 99/323.5 |
| 2006/0288876 A1 | * | 12/2006 | Berger | A23L 7/187 99/323.5 |

* cited by examiner

*Primary Examiner* — Omar Flores Sanchez
(74) *Attorney, Agent, or Firm* — Blakely Sokoloff Taylor & Zafman LLP

(57) ABSTRACT

A popcorn dispenser for use with a popcorn maker. The dispenser includes a hopper having two openings, the first opening larger than the second opening and sides tapering from the first opening to the second opening. A kernel catcher is located in the bottom of the dispenser adjacent to the second opening. There is a paddle wheel including a shaft and paddle blades below the kernel catcher. A turn dial is operationally coupled to the shaft so that when rotated, the shaft and paddle wheels rotate caused kernels in the hopper to be moved from the hopper to a bowl below the hopper.

9 Claims, 5 Drawing Sheets

POPCORN DISPENSER

BACKGROUND OF THE INVENTION

The invention is directed to the field of kettle popcorn makers and specifically, dispensers associated with such popcorn makers.

BRIEF SUMMARY OF THE INVENTION

The invention is directed to a popcorn dispenser for use with a popcorn maker to allow popcorn to be easily moved to a bowl under the dispenser. The popcorn dispenser includes a hopper having two openings. The first opening is larger than the second opening and is closest to the mechanism used to make the popcorn. The hopper has sides tapering from the first opening to the second opening which is located above the bowl into which popcorn is moved by operation of a turn dial of the dispenser. The dispenser includes a kernel catcher disposed adjacent to the second opening for catching un-popped and partially popped kernels to prevent them from being moved from the hopper to the bowl. A paddle wheel including a shaft and paddle blades is located below the kernel catcher. The turn dial operationally is coupled to the shaft and configured, when rotated, to rotate the shaft. Preferably, there is a gear mechanism including a first gear coupled to the shaft and a second gear operationally coupled to the first gear and to the turn dial. The paddle blades are configured so that when in a fixed position, popped kernels are prevented from being discharged from the hopper. However, when rotated, the paddle blades allow popped kernels to be moved from the hopper to the bowl.

The dispenser is for use with a popcorn machine such as a kettle popper. The popcorn dispenser is located below the kettle and positioned so that popcorn made by the kettle falls into the hopper. When the paddle wheels are rotated, the popcorn is moved from the dispenser to the bowl positioned below the popcorn dispenser.

DETAILED DESCRIPTION OF THE INVENTION

Figure 1:
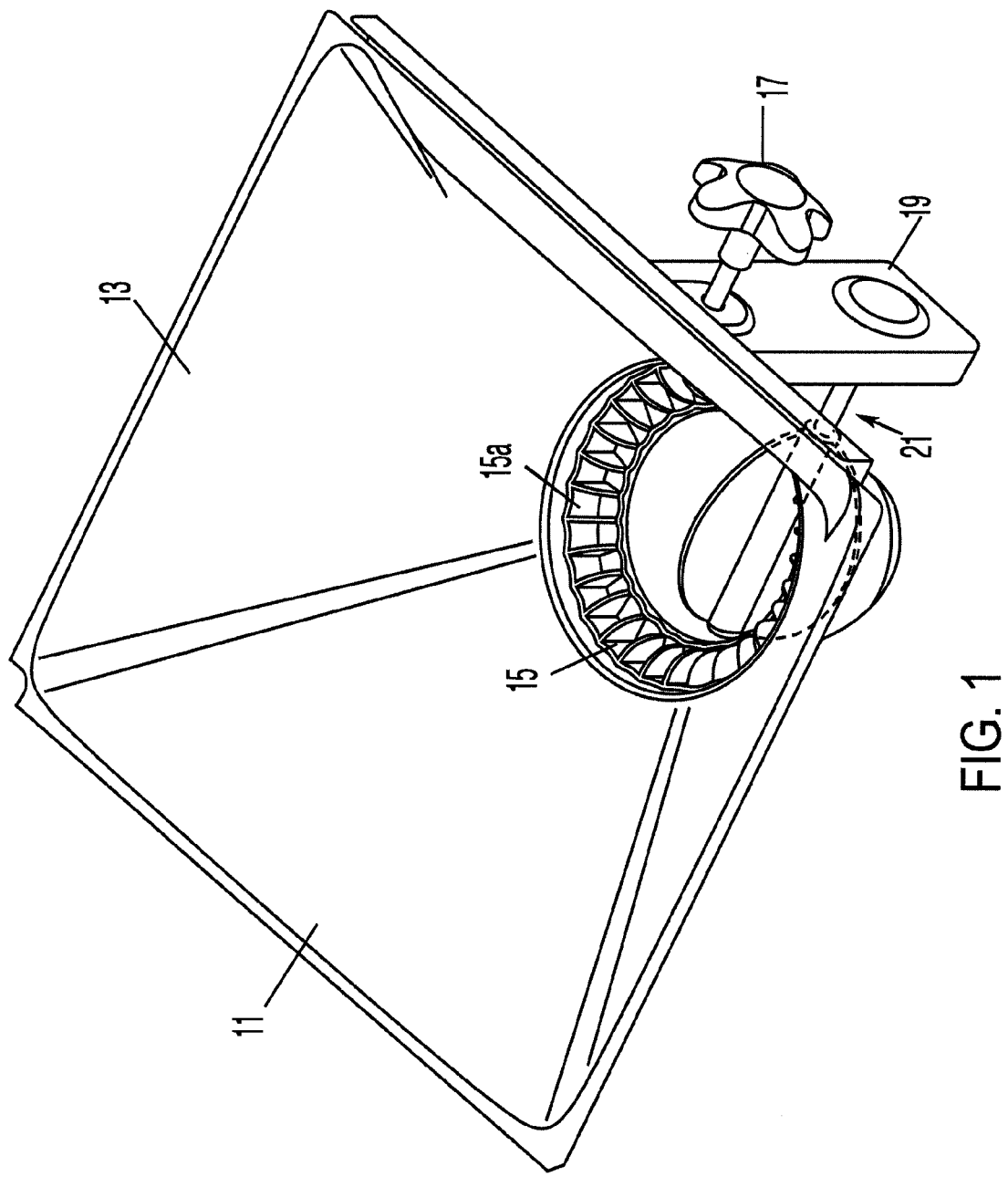
FIG. 1 is a top, side perspective view of the invented popcorn dispenser.

Referring first to FIG. 1, the invented popcorn dispenser 11 includes a hopper 13, kernel catcher 15, turn dial 17, gear mechanism 19 and paddle wheel 21.

Figure 4:
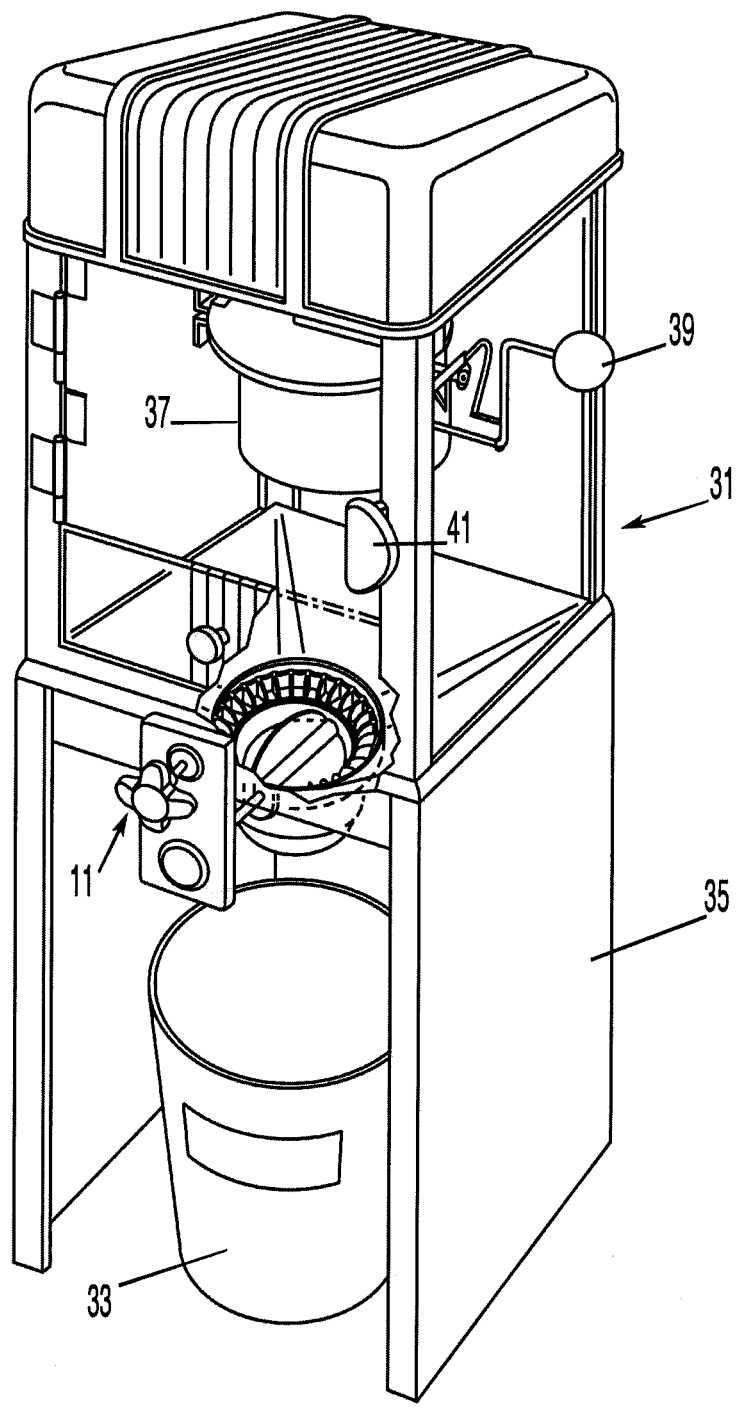
FIG. 4 is a front, side perspective view showing the invented popcorn dispenser installed as part of a complete popcorn maker.

In operation, the invented popcorn dispenser 11 is used in conjunction with a popcorn maker of the type shown in FIG. 4. As popcorn is produced by the popcorn maker, the popcorn, and un-popped, or partially popped kernels fall into hopper 13.

Due to the presence of paddle wheel 21, popcorn and any un-popped kernels tend to accumulate in hopper 13 which should be sized so as to hold at least one full batch of popcorn being popped.

When it is desired to remove popcorn from the dispenser 13, turn dial 17 is rotated which, by operation of gears inside gear mechanism 19 cause paddle wheel 21 to rotate thereby enabling popped kernels to be moved from dispenser 13 into a bowl (not shown in FIG. 1) which are then removed from the popcorn maker. Kernel catcher 15 includes slots 15a which are sized so that a fully popped kernel is too large to fit inside one of the slots 15a, but un-popped kernels, or partially popped kernels are captured by slots 15a at the time kernels are being moved from dispenser 13 to the bowl by operation of turn dial 17. That is, any particles which are smaller than a fully popped kernel such as oil or other particles resulting from operation of the popcorn machine as well as un-popped/partially popped kernels are captured by slots 15a as the popcorn moves from hopper 13 by rotation of paddle wheel 21.

As shown in FIG. 1, hopper 13 includes a relatively wide opening at one end for receiving popcorn produced by the popcorn machine. The other end is a relatively narrow opening with the two ends connected by tapered sides which taper from the large opening at one end to the smaller opening at the other end. In this manner, popcorn from a popcorn popper falls into hopper 13, and is held in the hopper until turn dial 17 is rotated which causes the blades of the paddle wheel to rotate which in turn cause popcorn to be removed from hopper 13 and fall into the bowl below the paddle wheel blades. The taper of the hopper causes popcorn in hopper 13 to fall by gravity down to the smaller end at the bottom side of the hopper. Due to their smaller size, un-popped and partially popped kernels tend to accumulate along the sides of dispenser 13 so that as popcorn is removed from the dispenser the un-popped and partially popped kernels fall into the slots 15a of kernel catcher 15 since slot 15a is sized to be too small to hold fully popped popcorn.

Figure 2:
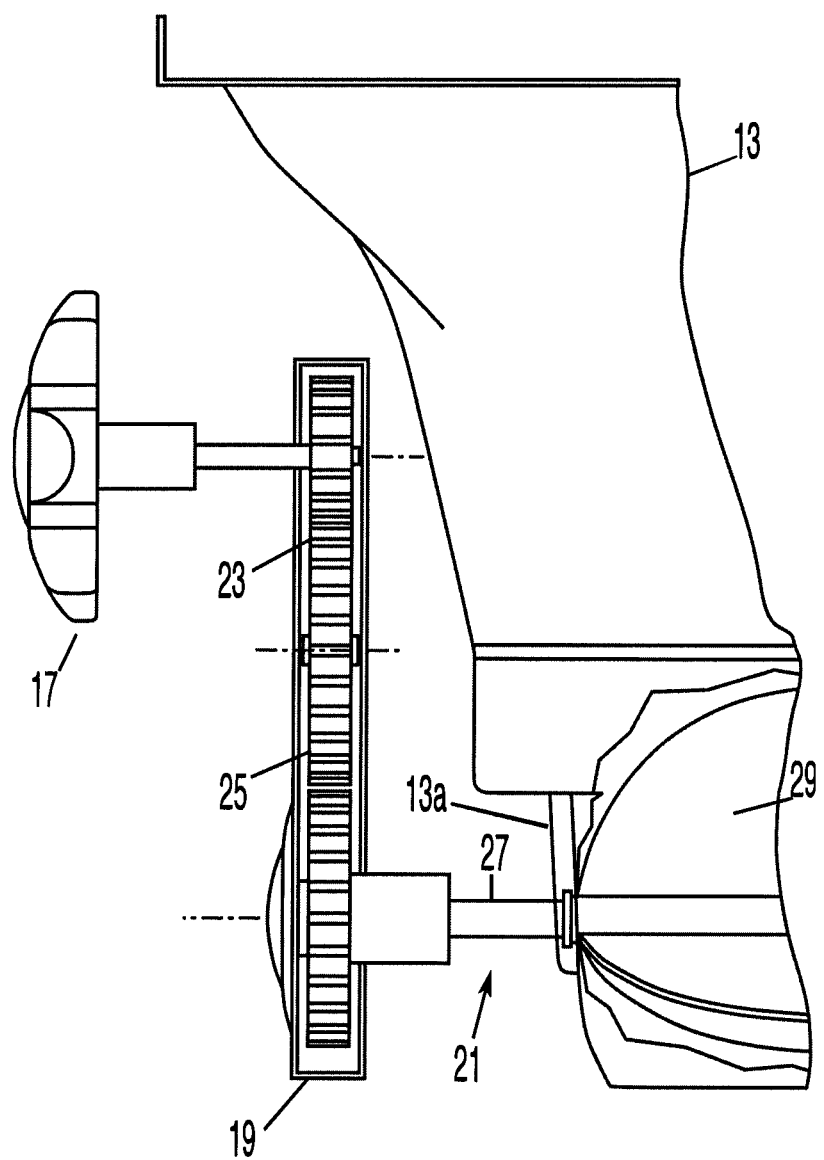
FIG. 2 is a side elevation partial cutaway view showing a detailed view of a turn dial, gear mechanism and paddle wheel elements of the invented popcorn dispenser.

Referring next to FIG. 2, gear mechanism 19 is connected to the dispenser by paddle wheel shaft 27 which connects the gear mechanism to paddle wheel blades 29. Dispenser 13 includes a flange 13a which extends from its bottom and includes a mechanism for holding shaft 27 in place which in turn holds gear mechanism 19 in place relative to dispenser paddle blades 29. The specifics of the connection of the shaft to flange 13a are not important for a proper understanding of the invention.

As turn dial 17 is manually rotated, it causes gear 23 to rotate in the same direction that turn dial 17 rotates. Gear 23 in turn engages gear 25 causing gear 25 to rotate in the opposite direction. As gear 25 rotates, shaft 27 which is connected to gear 25 in turn rotates thereby causing blades 29 to rotate as well. Of course, gear 23 can be sized to have a diameter smaller than that of gear 25 which would cause gear 25 to rotate at a slower speed than gear 23, but provide more torque. Similarly, gear 23 can be sized so as to have a diameter larger than gear 25 which would cause gear 25 to rotate at a faster speed, but with less torque. Additionally, internal gearing (not shown) enables turn dial 17 to be off set from the axis of rotation of gear 23. The specifics of the gear mechanism, and various diameter ratios are not important to an understanding of the invention, and are well within the abilities of persons having ordinary skill in the art to determine the best gear sizes and ratios.

Figure 3:
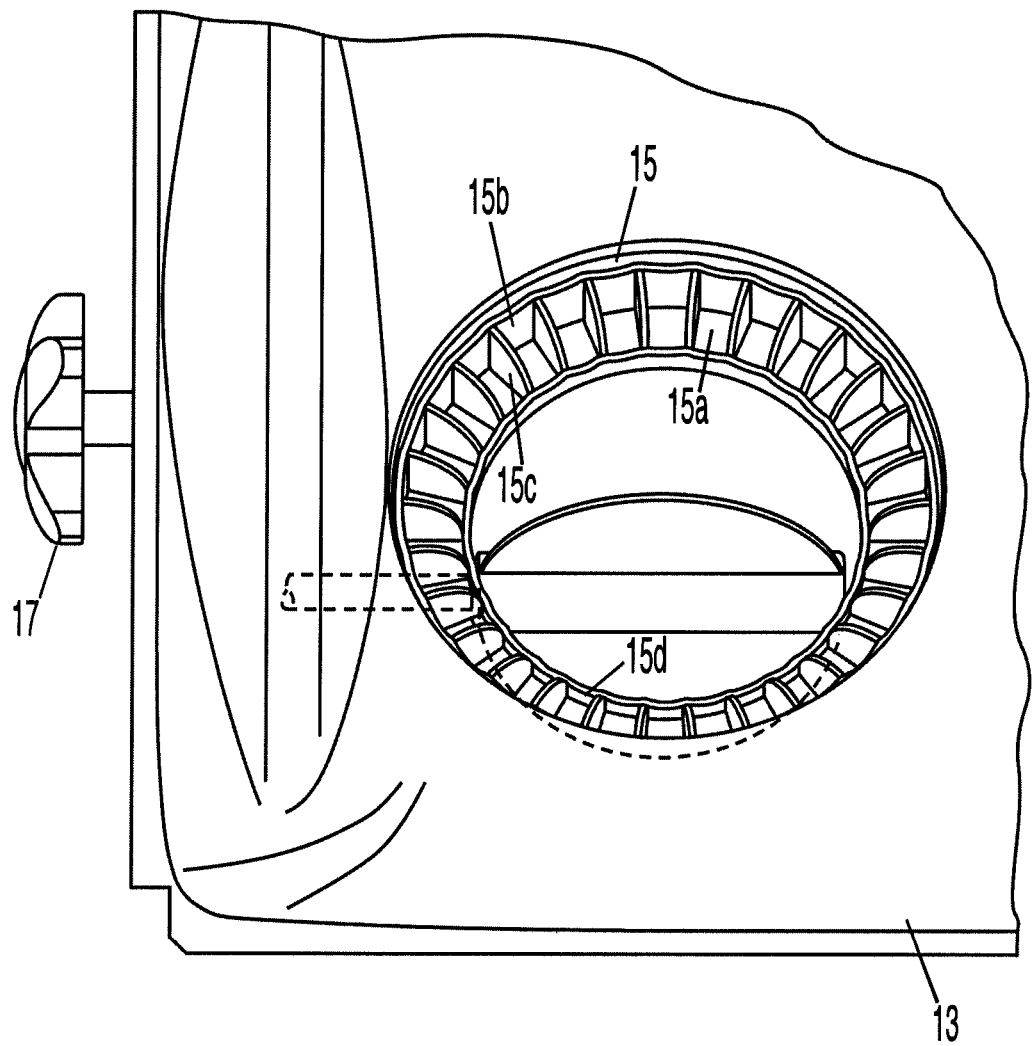
FIG. 3 is a top, side perspective partial cutaway view showing the kernel catcher mechanism of the invented popcorn dispenser.

Referring next to FIG. 3, further details regarding kernel catcher 15 will be described. As shown, kernel catcher 15 includes a ring of slots 15a which encircle the kernel catcher.

Each slot 15*a* includes a back wall 15*b*, side walls 15*c* and small raised lip 15*d*. Kernel catcher 15 fits into a recessed area in the bottom of hopper 13 and is removable for cleaning. Although illustrated as forming a circular-shaped opening surrounded by the ring of slots 15*a*, other shapes may be used to form the opening. For example, a square or rectangular shaped opening as part of the tapering sides of the hopper may be used.

As previously noted, sidewalls 15*c* are arranged so that each slot 15*a* is sized so that fully popped kernels cannot fit into slot 15*a*. Each slot 15*a* includes a back wall 15*b* and sidewalls 15*c*. Un-popped, and partially popped kernels as well as other debris will tend to be captured by slots 15*a* as paddle wheel blades 29 rotate. As un-popped or partially popped kernels fall into slots 15*a*, raised lips 15*d* prevent the captured particles from moving from slot 15*a* onto paddle wheel blades 29. Of course, as slots 15*a* become filled with un-popped kernels and the like, once a slot 15*a* is full, it will no longer be able to capture additional debris. Thus, kernel catcher 15 is easily removable for cleaning purposes.

FIG. 4 shows the invented popcorn dispenser 11 installed in a popcorn maker 31. As shown in FIG. 4, a self-standing bowl or bucket 33 is below the popcorn dispenser to receive popcorn dispensed by the dispenser when turn dial 17 is rotated. The popcorn maker includes a stand 35 having three sides for supporting the popcorn making mechanism. The popcorn making mechanism includes a kettle 37, turn handle 39 and door 41. Although not important for an understanding of the invention, popcorn maker 31 operates in a manner well known in the art in that when door 41 is opened, handle 39 is rotated so as to facilitate the loading of kettle 37 with popcorn kernels. After kettle 37 is loaded with kernels, door 41 is closed, the kettle is returned to its operating position as shown in FIG. 4, and the machine is turned on so that popcorn is produced. As the popcorn is produced, it falls into hopper 13 so that popcorn can be dispensed by rotating dial 17 as described above.

Figure 5:
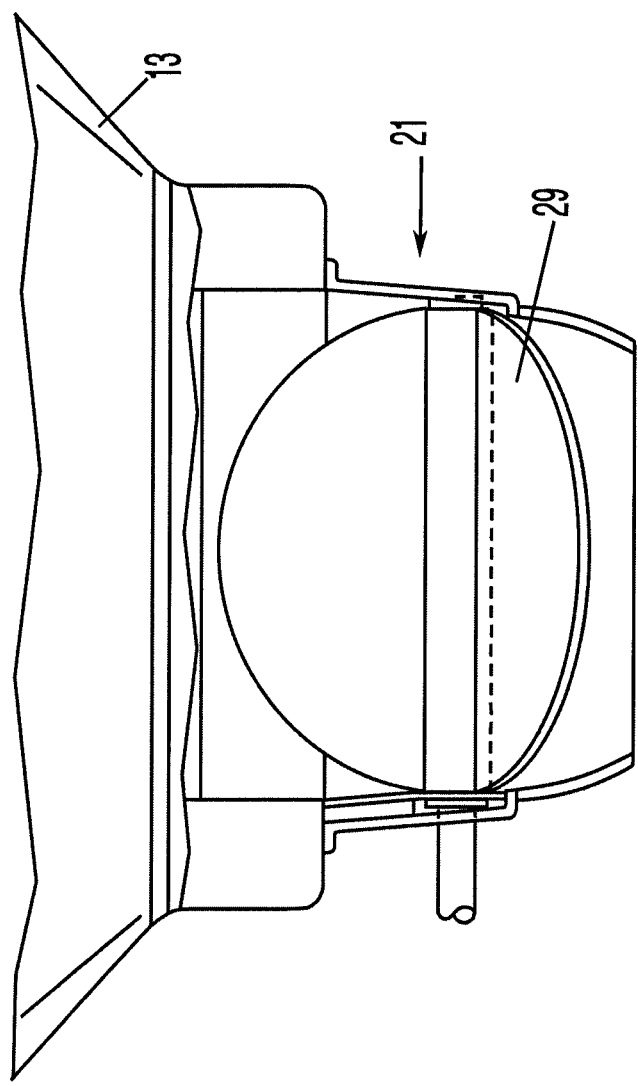
FIG. 5 is a detailed view showing the paddle wheel of the invented popcorn dispenser.

Further details regarding paddle wheel 21 will now be described with reference to FIG. 5. A set of half-moon shaped paddles 29 made of a flexible material such as silicone are installed on shaft 27. The size and shape of the flexible material is such that when the wheel is in a stationary position, popcorn accumulates in hopper 13. Popcorn continues to accumulate until such time that it is desired to dispense some of the popcorn from hopper 13 into bowl 33 shown in FIG. 4. Referring to FIG. 2, as turn dial 17 is rotated, gear 23 which is connected to dial 17 rotates. The teeth of gear 23 engage the teeth of gear 25 which in turn is coupled to shaft 27 of paddle wheel 21. Although gear mechanism 19 is not necessary since turn dial 17 could be coupled directly to shaft 21, gear mechanism 19 is provided so that the position of turn dial 17 is in a more convenient position for operating the dispenser when in use.

We claim:

1. A popcorn dispenser comprising:
   a) a hopper having two openings, the first opening larger than the second opening and sides tapering from the first opening to the second opening;
   b) a kernel catcher disposed adjacent to the second opening, wherein the kernel catcher comprises a plurality of slots sized to capture and retain un-popped and partially popped kernels of corn, each of said slots including a back wall, sidewalls and a raised lip;
   c) a paddle wheel disposed below said kernel catcher, said paddle wheel including a shaft and a plurality of paddle blades fixedly coupled around said shaft;
   d) a turn dial operationally coupled to said shaft and configured, when rotated, to rotate said shaft.

2. The popcorn dispenser defined by claim 1 further comprising a gear mechanism including a first gear coupled to said shaft and a second gear operationally coupled to said first gear and to said turn dial.

3. The popcorn dispenser defined by claim 1 wherein the kernel catcher is removable.

4. The popcorn dispenser defined by claim 1 wherein said paddle blades are configured so that when in a fixed predetermined position relative to said opening, popped kernels are prevented from being discharged from said hopper, and when rotated, allows popped kernels to be moved from said hopper to a bowl disposed below said paddle blades.

5. A popcorn machine comprising:
   a) a mechanism for making popcorn;
   b) a popcorn dispenser as defined by claim 1 disposed below said mechanism and positioned so that popcorn made by said mechanism falls into said hopper;
   c) a bowl disposed below said popcorn dispenser and positioned so that popcorn in said hopper is discharged into said bowl when said turn dial is rotated.

6. A popcorn dispenser comprising:
   a) a hopper having two openings, the first opening larger than the second opening and sides tapering from the first opening to the second opening;
   b) a kernel catcher disposed adjacent to the second opening, wherein the kernel catcher comprises a plurality of slots sized to capture and retain un-popped and partially popped kernels of corn, each of said slots including a back wall, sidewalls and a raised lip;
   c) a paddle wheel disposed below said kernel catcher, said paddle wheel including a shaft and a plurality of paddle blades fixedly coupled around said shaft;
   d) a turn dial operationally coupled to said shaft and configured, when rotated, to rotate said shaft,
   wherein the kernel catcher comprises a plurality of slots sized to capture un-popped and partially popped kernels of corn.

7. A popcorn dispenser comprising:
   a) a hopper having two openings, the first opening larger than the second opening and sides tapering from the first opening to the second opening;
   b) a kernel catcher disposed adjacent to the second opening, wherein the kernel catcher comprises a plurality of slots sized to capture and retain un-popped and partially popped kernels of corn, each of said slots including a back wall, sidewalls and a raised lip;
   c) a paddle wheel disposed below said kernel catcher, said paddle wheel including a shaft and a plurality of paddle blades fixedly coupled around said shaft;
   d) a turn dial operationally coupled to said shaft and configured, when rotated, to rotate said shaft,
   wherein said paddle blades are configured so that when in a fixed predetermined position relative to said opening, popped kernels are prevented from being discharged from said hopper, and when rotated, allows popped kernels to be moved from said hopper to a bowl disposed below said paddle blades.

8. The popcorn dispenser of claim 6, further comprising:
   a) a mechanism for making popcorn;
   b) a popcorn dispenser as defined by claim 1 disposed below said mechanism and positioned so that popcorn made by said mechanism falls into said hopper;
   c) a bowl disposed below said popcorn dispenser and positioned so that popcorn in said hopper is discharged into said bowl when said turn dial is rotated.

9. The popcorn dispenser of claim 7, further comprising:
a) a mechanism for making popcorn;
b) a popcorn dispenser as defined by claim 1 disposed below said mechanism and positioned so that popcorn made by said mechanism falls into said hopper;
c) a bowl disposed below said popcorn dispenser and positioned so that popcorn in said hopper is discharged into said bowl when said turn dial is rotated.

\* \* \* \* \*